(12) United States Patent
Nobis et al.

(10) Patent No.: US 8,970,852 B2
(45) Date of Patent: Mar. 3, 2015

(54) LASER PROJECTOR FOR CHASSIS ALIGNMENT

(75) Inventors: Guenter Nobis, Nuertingen (DE); Steffen Abraham, Hildesheim (DE); Matthias Gebhard, Stuttgart (DE); Ulrich Kallmann, Tuebingen (DE)

(73) Assignee: Robert Bosch GmbH, Stuttgart (DE)

( * ) Notice: Subject to any disclaimer, the term of this patent is extended or adjusted under 35 U.S.C. 154(b) by 233 days.

(21) Appl. No.: 13/394,401

(22) PCT Filed: Jul. 22, 2010

(86) PCT No.: PCT/EP2010/060629
§ 371 (c)(1), (2), (4) Date: May 11, 2012

(87) PCT Pub. No.: WO2011/026691
PCT Pub. Date: Mar. 10, 2011

(65) Prior Publication Data
US 2012/0218565 A1    Aug. 30, 2012

(30) Foreign Application Priority Data

Sep. 7, 2009 (DE) .................. 10 2009 029 234

(51) Int. Cl.
*G01B 11/14* (2006.01)
*G01B 11/25* (2006.01)

(52) U.S. Cl.
CPC ...... *G01B 11/2513* (2013.01); *G01B 2210/286* (2013.01)
USPC ............................ 356/603; 356/622; 353/28

(58) Field of Classification Search
CPC .......... G02B 5/18; G02B 27/42; G02B 21/00; G02B 27/46; H04N 5/74; H04N 9/31; H04N 9/3161
USPC ........ 356/603, 611, 622; 353/28, 31, 34, 122; 362/257, 311.06
See application file for complete search history.

(56) References Cited

U.S. PATENT DOCUMENTS

| | | | | |
|---|---|---|---|---|
| 4,030,835 A | * | 6/1977 | Firester et al. | 356/521 |
| 4,303,341 A | * | 12/1981 | Kleinknecht et al. | 356/636 |
| 4,462,095 A | * | 7/1984 | Chen | 369/44.13 |

(Continued)

FOREIGN PATENT DOCUMENTS

| | | |
|---|---|---|
| EP | 0 321 965 | 6/1989 |
| EP | 0 355 839 | 2/1990 |

(Continued)

OTHER PUBLICATIONS

International Search Report for PCT/EP2010/060629, dated Mar. 15, 2011.

*Primary Examiner* — Hoa Pham
(74) *Attorney, Agent, or Firm* — Kenyon & Kenyon LLP

(57) ABSTRACT

A laser projector for chassis alignment has a laser light source emitting a laser light beam, an optical element which generates a structured laser light pattern when it is irradiated by the laser light beam, a detector which is situated in such a way that it is irradiated by a sub-area of the structured laser light pattern and generates an output signal which is correlated with the radiation, and an evaluation unit which compares the output signal generated by the detector with at least one predefined setpoint value and turns off the laser light source if it detects a significant deviation of the output signal from the setpoint value.

5 Claims, 2 Drawing Sheets

(56) References Cited

U.S. PATENT DOCUMENTS

| | | |
|---|---|---|
| 4,663,760 A | 5/1987 | Shimada et al. |
| 5,193,120 A | 3/1993 | Gamache et al. |
| 5,200,597 A | 4/1993 | Eastman et al. |
| 5,708,497 A * | 1/1998 | Fujieda ............ 356/71 |
| 5,835,121 A | 11/1998 | Genovese et al. |
| 6,657,711 B1 | 12/2003 | Kitagawa et al. |
| 6,975,457 B1 * | 12/2005 | Greenaway et al. ......... 359/565 |
| 7,003,075 B2 * | 2/2006 | Miyake et al. ............ 378/82 |
| 2004/0184037 A1 * | 9/2004 | Muenter et al. ............. 356/486 |
| 2005/0254044 A1 | 11/2005 | Sugiura et al. |
| 2008/0111995 A1 * | 5/2008 | Lee et al. .............. 356/499 |
| 2009/0185274 A1 | 7/2009 | Shpunt |
| 2011/0242544 A1 * | 10/2011 | Stroessner et al. ............ 356/496 |

FOREIGN PATENT DOCUMENTS

| | | |
|---|---|---|
| JP | 4-158247 | 6/1992 |
| JP | 7-37024 | 2/1995 |
| JP | 2001-4344 | 1/2001 |
| JP | 2009-513001 | 3/2009 |
| WO | WO 98/41824 | 9/1998 |
| WO | WO 2006/065437 | 6/2006 |
| WO | WO 2007/040877 | 4/2007 |

* cited by examiner

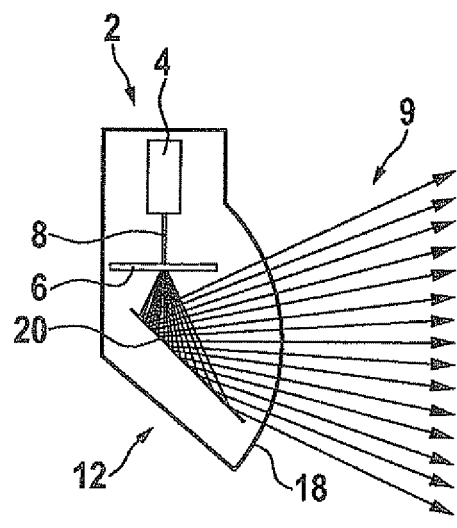
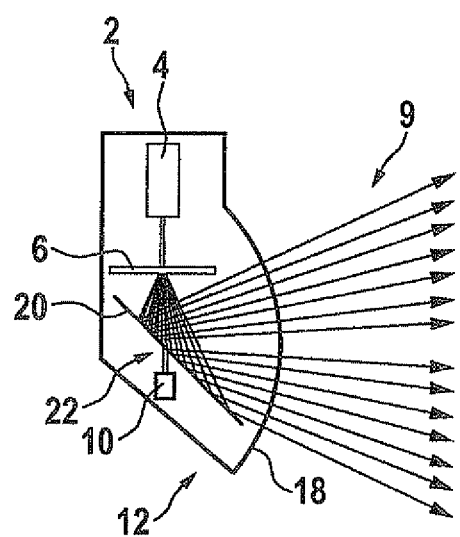
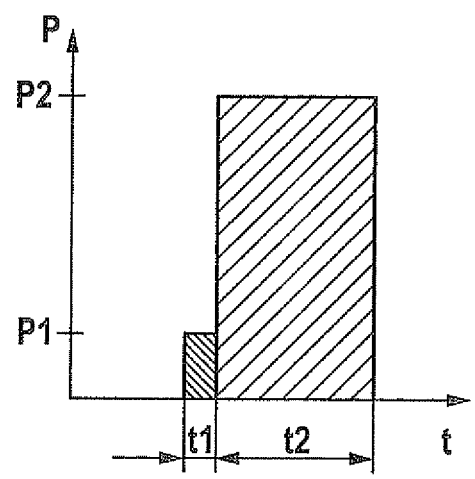

LASER PROJECTOR FOR CHASSIS ALIGNMENT

BACKGROUND OF THE INVENTION

1. Field of the Invention

The present invention relates to a laser projector for chassis alignment.

2. Description of Related Art

The use of laser radiation for chassis alignment is known from the related art. Since the interaction between laser radiation and biological tissue may result in damage to the tissue, protective measures are needed to minimize the risks posed by a laser light source.

The protective measures are supposed to prevent exposure to dangerous radiation and also ensure appropriate protection in the event of a fault.

Known laser protection devices have a protective housing which does not release any laser radiation into the surroundings and which interrupts laser operation when the protective housing is opened.

However, a protective housing of this type is not suitable for use in chassis alignment, since laser radiation must be available even outside a protective housing for measuring and projection purposes. Examples hereof are optical chassis alignment systems, laser projection devices and laser distance measuring tools.

BRIEF SUMMARY OF THE INVENTION

One object of the present invention is therefore to create an improved device for providing laser radiation for chassis alignment, which does not pose any risk to the user in the event of a malfunction.

A laser projector for chassis alignment according to the present invention has a laser light source which is designed to emit a laser light beam, and an optical element which is designed in such a way that it generates a structured laser light pattern when it is irradiated by the laser light beam. The laser projector also has a detector which is situated in such a way that it is irradiated by a sub-area of the structured laser light pattern during operation of the laser light source and generates an output signal which is correlated with the radiation. The laser projector also has an evaluation unit which compares the output signal generated by the detector with at least one predefined setpoint value and turns off the laser light source if a significant deviation from the predefined setpoint value is detected.

The present invention also includes a laser projector which has a laser light source designed to emit a laser light beam, and an optical element which generates a structured laser light pattern when it is irradiated by the laser light beam, a detector being situated in such a way that it is irradiated by a sub-area of the structured laser light pattern having a very high radiation intensity during operation of the laser light source and absorbs this sub-area. As a result, the sub-area having a very high radiation intensity is blocked out of the laser light pattern.

The present invention also includes a laser projector which has a laser light source, an optical element and a reflector or mirror which is situated in such a way that, during operation, it is irradiated at least by a portion of the laser light pattern generated by the optical element and deflects this portion.

In a laser projector according to the present invention, a malfunction, i.e., a deviation in the intensity of the sub-area of the structured laser light pattern detected by the detector from a predefined setpoint value, is detected, and the laser light source is turned off if a malfunction of this type is detected. Safety during operation of the laser projector is increased by the fact that the laser light source is turned off when a malfunction is detected.

Safety is further increased by the fact that the detector is irradiated by a sub-area of the laser light pattern having very high radiation intensity, and this sub-area is blocked out of the laser light pattern, since an area of high radiation intensity poses a particular risk, and this risk is reduced by blocking out the particularly radiation-intensive sub-area.

The overall length of the laser projector may be reduced by deflecting the laser light pattern with the aid of a reflector. A laser projector having a reduced overall length may be adapted particularly effectively to predefined spatial conditions and, in particular, may also be used in small workshop areas.

In one specific embodiment, the laser projector has a housing, at least one area of the housing having a transparent design. With the aid of a housing, the components of the laser projector are protected against external influences, for example dirt or moisture, and the surroundings are protected against particularly intensive radiation of the laser light beam in the vicinity of the optical element. Due to the fact that at least one area of the housing has a transparent design, the laser light pattern generated by the optical element may exit the housing and be used for measuring and/or projection purposes.

In one specific embodiment, the detector is situated within the housing. The detector is thereby protected against harmful environmental influences by the housing. In addition, the radiation reflected by the detector and blocked out of the laser light pattern remains inside the housing, so that the surroundings are protected against the particularly intensive radiation which is blocked out by the detector and reflected as needed.

In one specific embodiment, the detector is mounted on a wall of the housing. This enables the detector to be fixed inside the housing particularly easily and securely.

In one specific embodiment, the laser projector has at least one reflector which is situated in such a way that it deflects at least one sub-area of the structured laser light pattern onto the detector.

The mounting location of the detector may be flexibly selected by using a reflector which deflects a sub-area of the laser light pattern. In particular, the detector may be situated outside the area irradiated by the structured laser light pattern.

In one specific embodiment, the reflector is mounted on a wall of the housing. The reflector may be attached to a wall of the housing particularly easily and economically.

In one specific embodiment of a laser projector which has a reflector, a recess or opening is provided in the reflector in such a way that at least one area of the laser light pattern is not deflected by the reflector but instead passes through the reflector via the recess or opening. This makes it particularly easy to block out an area of the deflected laser light pattern. In particular, a particularly radiation-intensive area may be blocked out of the laser light pattern to reduce the risk posed by particularly intensive laser radiation.

In one specific embodiment, a detector is situated on the side of the reflector facing away from the laser light source in such a way that, during operation of the laser light source, the detector is irradiated by the sub-area of the laser light pattern passing through the recess in the reflector and generates an output signal which is correlated with the radiation. This makes it possible to monitor the operation of the laser projector particularly easily and effectively.

In one specific embodiment, the detector is connected to an evaluation unit which compares the output signal generated by the detector with at least one predefined setpoint value and turns off the laser light source if it detects a significant deviation of the output signal generated by the detector from the predefined setpoint value. The safety of the laser projector is increased by the fact that the laser light source is turned off in the event of a malfunction in which the output signal generated by the detector deviates from a predefined setpoint value.

In one specific embodiment, the recess is situated in an area of the reflector which is irradiated by a sub-area of the laser light pattern having a high radiation intensity during operation of the laser light source. This blocks an area having a very high radiation intensity out of the laser light pattern. Since the laser light pattern exiting the laser projector no longer includes the area of very high radiation intensity, the safety is further increased during operation of the laser projector.

The present invention also includes a method for operating a laser projector, in particular a laser projector according to the present invention, in which, in a first step, the laser light source is activated by a prepulse in such a way that it emits laser light having a first light power or intensity. At least a portion of the laser light generated by the prepulse is detected by a detector, and an output signal generated by the detector, which is correlated with the detected laser light, is evaluated by an evaluation unit. If the evaluation unit does not determine a fault during evaluation, the laser light source is activated by a main pulse in a second step in such a way that it emits laser light at a second light power or intensity, the second light power being greater than the first light power and/or a longer laser light signal being emitted by the main pulse than by the prepulse.

A method of this type according to the present invention permits particularly safe operation of the laser projector, since, due to the prepulse, during which the laser light beam has a reduced intensity or duration which poses no risk, it is initially determined whether a fault has occurred before a main pulse is triggered, with the aid of which a laser light pattern is generated which is very dangerous in the event of a malfunction, due to its higher intensity or duration.

In one specific embodiment of the method according to the present invention, the laser light source is turned off if a fault is determined by the evaluation unit during the evaluation. The safety of the operation of a laser projector according to the present invention is increased even further by the fact that the laser light source is turned off after a fault is determined.

BRIEF DESCRIPTION OF THE DRAWINGS

FIG. 4 shows a fourth exemplary embodiment of a laser projector according to the present invention.

FIG. 5 shows a fifth exemplary embodiment of a laser projector according to the present invention.

FIG. 6 shows a diagram which describes the time progression of the emitted light power in a method according to the present invention for operating a laser projector.

DETAILED DESCRIPTION OF THE INVENTION

Figure 1:
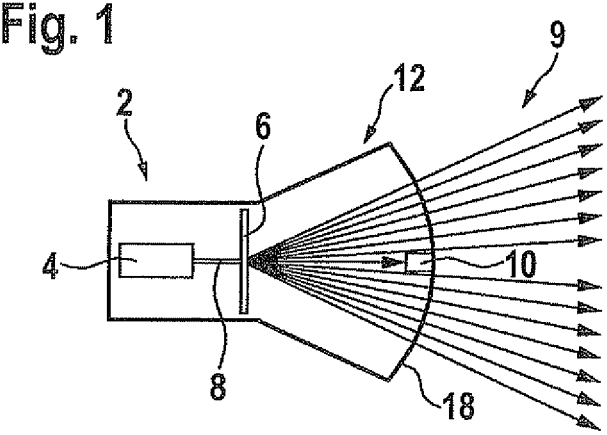
FIG. 1 shows a first exemplary embodiment of a laser projector according to the present invention.

FIG. 1 shows a first exemplary embodiment of a laser projector 2 according to the present invention, which includes a laser light source 4 which emits a laser light beam 8 during operation.

An optical element 6, which is designed, for example, as a refraction grating, is provided in an area of laser light beam 8 emitted by laser light source 4. Optical element 6 generates a structured laser light pattern 9 when it is irradiated by laser light beam 8. A protective housing 12 is provided around laser light source 4 and optical element 6. On the side of optical element 6 facing away from laser light source 4, protective housing 12 has a wall 18 which includes an area of an at least partially transparent design through which laser light pattern 9 generated by optical element 6 exits protective housing 12 to be used for measuring and/or projection tasks.

A detector 10 is situated in a location of the transparent area which is irradiated by a particularly radiation-intensive area of laser light pattern 9 (diffraction to the order of 0). Detector 10 is opaque to laser light, so that a particularly radiation-intensive area of laser light pattern 9 striking detector 10 is blocked out and does not exit protective housing 12 through the transparent area of wall 18.

In addition, the particularly radiation-intensive area of laser light pattern 9 is detected by detector 10, and the output signal generated by detector 10 in response to the detected laser light is compared with a predefined setpoint value in an evaluation unit which is not illustrated. If the value ascertained by detector 10 impermissibly deviates from the predefined setpoint value, the evaluation unit detects a malfunction and turns off laser light source 4 to ensure safety during operation of laser projector 2.

Due to the fact that detector 10 is mounted directly on wall 18 of protective housing 12 opposite optical element 6, no additional holding fixture or attachment structure is needed. Detector 10 may be mounted particularly easily and economically.

Figure 2:
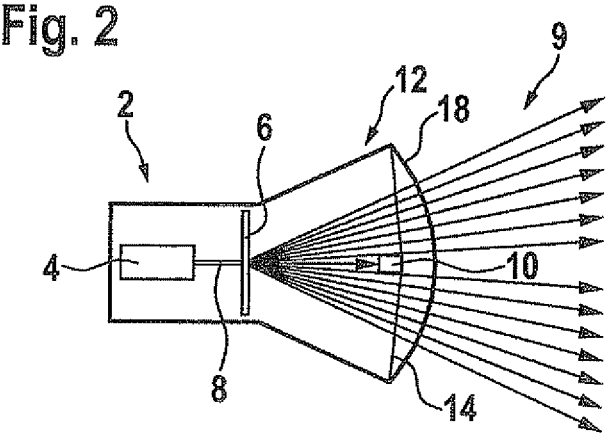
FIG. 2 shows a second exemplary embodiment of a laser projector according to the present invention.

FIG. 2 shows a second exemplary embodiment of a laser projector (2) according to the present invention, the laser projector being configured similar to the first exemplary embodiment of a laser projector 2 according to the present invention shown in FIG. 1. The elements of laser projector 2 which correspond to the exemplary embodiment shown in FIG. 1 will therefore not be described again.

Unlike the exemplary embodiment shown in FIG. 1, detector 10 in the exemplary embodiment shown in FIG. 2 is not mounted directly on wall 18 of protective housing 12 which lies opposite optical element 6 and has an at least partially transparent design. Instead, an attachment structure 14 is provided between optical element 6 and wall 18 of protective housing 12. Detector 10 is mounted on attachment structure 14 in such a way that it is irradiated by a particularly radiation-intensive area of laser light pattern 9 generated by optical element 6.

Due to the use of an attachment device 14, detector 10 may be mounted closer to optical element 6 than in the first exemplary embodiment. A mechanical load on the at least partially transparent area of wall 18 of protective housing 12 which is opposite optical element 6 is also avoided. Detector 10 may therefore be securely attached without any risk of damaging the at least partially transparent wall 18.

Attachment device 14 may be provided with an adjusting device which makes it possible to adjust the position of detector 10. This enables detector 10 to be positioned particularly easily and effectively in such a way that it is irradiated by a desired sub-area of laser light pattern 9, in particular by a particularly radiation-intensive sub-area of laser light pattern 9.

The functionality of laser projector 2 illustrated in FIG. 2 corresponds to the functionality of the first exemplary embodiment illustrated in FIG. 1.

Figure 3:
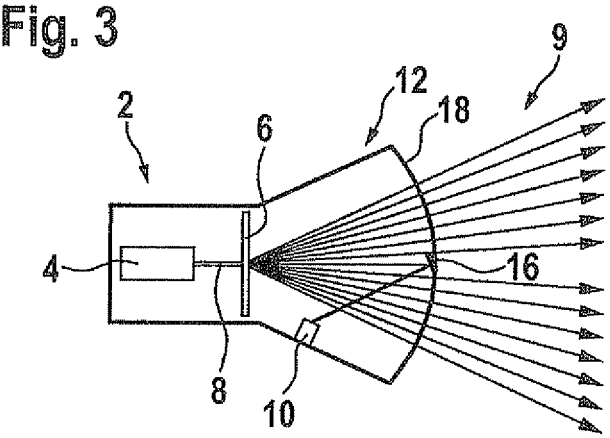
FIG. 3 shows a third exemplary embodiment of a laser projector according to the present invention.

FIG. 3 shows a third exemplary embodiment of a laser projector 2 according to the present invention, in which a reflector 16 is additionally provided. Reflector 16 is situated in such a way that it deflects an area of laser light pattern 9 generated by optical element 6 onto a detector 10 which is situated in an area outside laser light pattern 9. By using a reflector 16, detector 10 may be situated in any area outside laser light pattern 9. As a result, the size of detector 10 and the laying of its electrical connections pose no problems. In particular, the electrical connections of detector 10 do not need to be laid in an area which is irradiated by laser light pattern 9 during operation. Detector 10 is easy to attach, since it is not attached to the transparent area of wall 18.

In the exemplary embodiment illustrated in FIG. 3, reflector 16 is mounted directly on wall 18 of housing 12 which lies opposite optical element 6. In an alternative exemplary embodiment, which is not illustrated, reflector 16 may also be attached to an attachment device whose design is similar to attachment device 14 illustrated in the second exemplary embodiment in FIG. 2 and which is situated between wall 18 of housing 12 and optical element 6. This avoids a mechanical load on the partially transparent wall 18 due to reflector 16.

Attachment device 14 may also be provided with an adjusting device which makes it possible to adjust the position of reflector 16. As a result, reflector 16 may be positioned particularly easily and effectively in such a way that it is irradiated by the desired area of laser light pattern 9 and deflects this area onto detector 10.

FIG. 4 shows a fourth exemplary embodiment of a laser projector 2 according to the present invention. In this exemplary embodiment, a reflector 20 is provided to deflect entire laser light pattern 9 generated by optical element 6. In the illustrated exemplary embodiment, laser light pattern 9 is deflected by reflector 20 at a 90° angle in relation to laser light beam 8 generated by laser light source 4. However, the 90° angle illustrated in FIG. 4 is only by way of example. The desired exit angle may be set within a broad range by rotating reflector 20 around an axis which is perpendicular to the plane of the drawing. Reflector 20 may be set as early as its time of manufacture, and reflector 20 may be fixed in this position. This enables the position of reflector 20 to be set particularly accurately. Alternatively, laser projector 2 may be delivered having a rotatable reflector 20 in such a way that the exit angle of laser light pattern 9 may be set on-site by rotating reflector 20 and adapted to the particular requirements.

The use of a reflector 20 reduces the necessary minimum overall length of laser projector 2 in the exit direction of laser light pattern 9 from L to $L_{new}$. As a result, a laser projector 2 according to the present invention and according to the fourth exemplary embodiment may be used effectively even in the event of limited space conditions, which are the case, for example, in small workshops and/or test sites.

FIG. 5 shows a fifth exemplary embodiment of a laser projector 2 which has a reflector 20. The configuration of laser projector 2 illustrated in FIG. 5 largely corresponds to that of laser projector 2 illustrated in FIG. 4.

Unlike the fourth exemplary embodiment illustrated in FIG. 4, a recess 22 is provided in reflector 20 of the fifth exemplary embodiment, through which an area of laser light pattern 9 generated by the optical element passes through reflector 20 into the space on the side of reflector 20 facing away from optical element 6.

As a rule, recess 22 is positioned in such a way that an area of laser light pattern 9, which has a particularly high radiation intensity (diffraction to the order of 0), passes through recess 22 and is thus blocked out of laser light pattern 9. Safety during operation of laser projector 2 is increased by blocking out an area having a particularly high radiation intensity.

The area blocked out of laser light pattern 9 strikes a detector 10, which is situated on the side of reflector 20 facing away from laser light source 4. Detector 10 generates an output signal which is correlated with the radiation intensity of the area of laser light pattern 9 striking detector 10. The output signal generated by detector 10 is compared with at least one predefined setpoint value by an evaluation unit, which is not illustrated, and laser light source 4 is turned off if the comparison shows a deviation which exceeds a predefined limiting value.

A malfunction of laser projector 2 may be determined by comparing the output signal generated by detector 10 with a predefined setpoint value. Safety during operation of laser projector 2 is increased by the fact that laser light source 4 is turned off when a malfunction is determined.

FIG. 6 shows a diagram in which light power P (y axis) emitted by laser light source 4 in a method according to the present invention is plotted over time t (x axis).

In a method according to the present invention, laser light source 4 is initially activated by a prepulse of length t1 so that it generates a laser light beam 8 having a power P1 and length t1. A sub-area of light pattern 9 generated by the prepulse is detected by a detector 10 and supplied to an evaluation unit, as described above in connection with FIGS. 1 through 5.

If a malfunction is not determined during the evaluation in the evaluation unit, i.e., if the value ascertained by detector 10 lies within a predefined range around a predefined setpoint value, laser light source 4 is activated by a main pulse, which has a greater length t2, in such a way that it generates a laser light beam 8 which has a higher power P2 and greater length t2. The actual measurement or projection is carried out using laser light pattern 9 generated by the main pulse.

Safety during the operation of laser projector 2 is increased by the fact that a prepulse having reduced power P1 and shorter activation time t1 is initially triggered before the actual main pulse, which has greater power P2 and longer activation time t2, and the emission of a main pulse is reliably prevented if a malfunction is determined during detection and evaluation of laser light pattern 9 generated by the prepulse.

What is claimed is:

1. A laser projector for chassis alignment, comprising:
   a laser light source configured to emit a laser light beam;
   an optical element configured to receive the laser light beam and generate a structured laser light pattern from the received laser beam;
   a detector which is irradiated by at least one sub-area of the structured laser light pattern, wherein the at least one sub-area of the structured laser light pattern has a very high radiation intensity due to a diffraction to the order of 0, and wherein the detector blocks the at least one sub-area out of the structured laser light pattern; and
   an evaluation unit which performs a comparison between the output signal generated by the detector and at least one predefined setpoint value, and turns off the laser light source if the comparison results in a deviation.

2. The laser projector as recited in claim 1, further comprising:
   a housing having at least one transparent area, wherein the detector is situated within the housing.

3. The laser projector as recited in claim 2, wherein the detector is mounted on a wall of the housing.

4. The laser projector as recited in claim 2, further comprising:
   a reflector positioned to deflect the at least one sub-area of the structured laser light pattern onto the detector.

5. The laser projector as recited in claim 4, wherein the reflector is mounted on a wall of the housing.

* * * * *